United States Patent
Sasaki et al.

(10) Patent No.: US 7,224,139 B2
(45) Date of Patent: May 29, 2007

(54) SERVO DRIVER AND ENCODER SIGNAL PROCESSING IC

(75) Inventors: Kozo Sasaki, Nagano (JP); Yuichi Mizuguchi, Nagano (JP)

(73) Assignee: Harmonic Drive Systems Inc., Tokyo (JP)

( * ) Notice: Subject to any disclaimer, the term of this patent is extended or adjusted under 35 U.S.C. 154(b) by 168 days.

(21) Appl. No.: 10/543,408

(22) PCT Filed: Jan. 27, 2004

(86) PCT No.: PCT/JP2004/000721

§ 371 (c)(1),
(2), (4) Date: Jul. 25, 2005

(87) PCT Pub. No.: WO2004/068076

PCT Pub. Date: Aug. 12, 2004

(65) Prior Publication Data

US 2006/0186852 A1    Aug. 24, 2006

(30) Foreign Application Priority Data

Jan. 29, 2003    (JP) .............................. 2003-020698

(51) Int. Cl.
*G05B 1/06*    (2006.01)
(52) U.S. Cl. ...................... 318/638; 318/602; 318/605; 318/661
(58) Field of Classification Search .................... None
See application file for complete search history.

(56) References Cited

U.S. PATENT DOCUMENTS

| 5,640,007 | A | * | 6/1997 | Talbott et al. | ......... 250/231.15 |
| 5,682,895 | A | * | 11/1997 | Ishiguro | ..................... 600/440 |
| 6,127,948 | A | * | 10/2000 | Hillis et al. | ..................... 341/4 |
| 6,667,696 | B2 | * | 12/2003 | Rodi | ........................... 341/11 |
| 2002/0167420 | A1 | * | 11/2002 | Rodi | ............................. 341/6 |

FOREIGN PATENT DOCUMENTS

| JP | 08-018455 | 1/1996 |
| JP | 10-285970 | 10/1998 |
| JP | 2002-175586 | 6/2002 |

* cited by examiner

*Primary Examiner*—Lincoln Donovan
*Assistant Examiner*—Renata McCloud
(74) *Attorney, Agent, or Firm*—Flynn, Thiel, Boutell & Tanis, P.C.

(57) ABSTRACT

A servo driver (3) includes: an input section (11) for input-specifying the type of an encoder (7) at the side of an actuator (2); a control section (13) for generating a control signal (12) according to the type input; and an encoder signal processing IC (20) for switching the input port to which reception data (7S) is input form the encoder (7) according to the control signal (12). The encoder signal processing IC (20) is compatible with processing of an output of either a line-saving encoder or a 14-line encoder and can realize a highly general-purpose servo driver. This can solve the problem that the servo driver should be modified according to the type of the encoder mounted on the actuator.

4 Claims, 8 Drawing Sheets

RECEPTION DATA FORMAT

① : 2±0.2ms            SETUP
② : 90ms max           MULTIPLE ROTATION INFORMATION OUTPUT (100KHz±10%)
③ : 1ms±500μs          SETUP
④ : SINGLE CYCLE OF _Stb    Z-PHASE OUTPUT
⑤ : 1ms±500μs          SETUP
⑥ : 90ms max           SINGLE ROTATION INFORMATION OUTPUT (100KHz±10%)
⑦ :                    INCREMENTAL SIGNAL OUTPUT

SIGNAL SPECIFICATIONS DURING SINGLE ROTATION INFORMATION AND INCREMENTAL OUTPUT

OUTPUT AS 2-PHASE SIGNALS WITH 90° PHASE DIFFERENCE

SERVO DRIVER AND ENCODER SIGNAL PROCESSING IC

TECHNICAL FIELD

The present invention relates to a servo driver for driving/controlling an actuator comprised of a servomotor, reduction gear, and the like, and more specifically relates to an improvement in an encoder signal processing section mounted in the servo driver in order to process an output signal from an encoder attached to the actuator and to detect positional information and the like of the actuator.

BACKGROUND ART

A servomechanism is comprised of an actuator comprising a servomotor and a reduction gear, and a servo driver for servo-controlling the actuator on the basis of an output from an encoder attached to the actuator. There are line-saving encoders and 14-line encoders, and both types of encoders include incremental encoders and absolute encoders that can detect absolute positions.

Servo drivers commonly have their specifications set so that the actuator is servo controlled based on the output signal from a prescribed type of encoder. Therefore, when the type of encoder attached to the actuator is different, the servo driver that is combined with the actuator must also be modified.

Thus, the actuator and servo driver combination is determined by the type of encoder. It is therefore inconvenient that the servo driver must be modified when the encoder is of a different type, even if the servomotor and reduction gear comprising the actuator are the same. Since various servo drivers must also be prepared in accordance with the type of encoder, there is a drawback in that the cost effectiveness is poor.

DISCLOSURE OF THE INVENTION

In view of these points, a principal object of the present invention is to provide a servo driver equipped with an encoder signal processing section that is compatible with various types of encoders.

The present invention provides a servo driver for driving/controlling an actuator on the basis of encoder output signals fed from an encoder attached to the actuator to be controlled, characterized by having:

an encoder type input section for inputting whether the encoder is a line-saving encoder or a 14-line encoder, and/or whether the encoder is an incremental encoder or an absolute encoder, a control section for generating a control signal that corresponds to the encoder type information input via the encoder type input section, an encoder signal processing section for processing the encoder output signal and generating a parallel signal that shows the positional information of the actuator and the like, on the basis of the control signal, and a drive control section for servo-controlling the actuator on the basis of the parallel signal.

Here, the encoder signal processing section may have a serial input port for inputting line-saving encoder signals, an input port group that includes the serial input port for inputting 14-line encoder output signals, an output port for outputting the parallel signal to the drive control section, a receiving section for converting serial data that is input from the serial input port, into the parallel signal with a prescribed number of bits, and a first data selecting section for selecting the serial input port or the input port group as the input port for the encoder signal on the basis of a port switching signal serving as the control signal fed from the control section.

The encoder signal processing section may have a data generating section for generating incremental data and absolute data related to the positional information of the encoder on the basis of the parallel signal generated in the receiving section, and a second data selecting section for selecting whether to output the incremental data or the absolute data from the output port on the basis of the control signal fed from the control section.

The encoder type input section is provided in the servo driver of the present invention, and when the connected encoder type is input, a signal corresponding to the encoder type is fed from the control section to the encoder signal processing section.

In the encoder signal processing section, even when the line-saving encoder or the 14-line encoder is connected, the parallel signal that can be processed in the drive control section can be generated based on the output signal thereof by switching the input port on the basis of the control signal.

The encoder signal processing section is provided with the data generating section that can generate incremental data and absolute data, and in the second data selecting section, incremental data is selected and output from the output port to the drive control section on the basis of the control signal fed from the control section if the connected encoder is the incremental encoder. In a similar fashion, if the connected encoder is the absolute encoder, then absolute data is selected and output from the output port to the drive control section.

A general-purpose servo driver can therefore be obtained that can be used without regard to the type of encoder attached to the actuator.

The present invention also relates to an encoder signal processing IC incorporated into the servo driver, and the encoder signal processing IC according to the present invention is equipped with an encoder signal processing section having the above configuration.

BEST MODE FOR CARRYING OUT THE INVENTION

An example of a servomechanism provided with a servo driver according to the present invention is described below with reference to the drawings.

Figure 1:
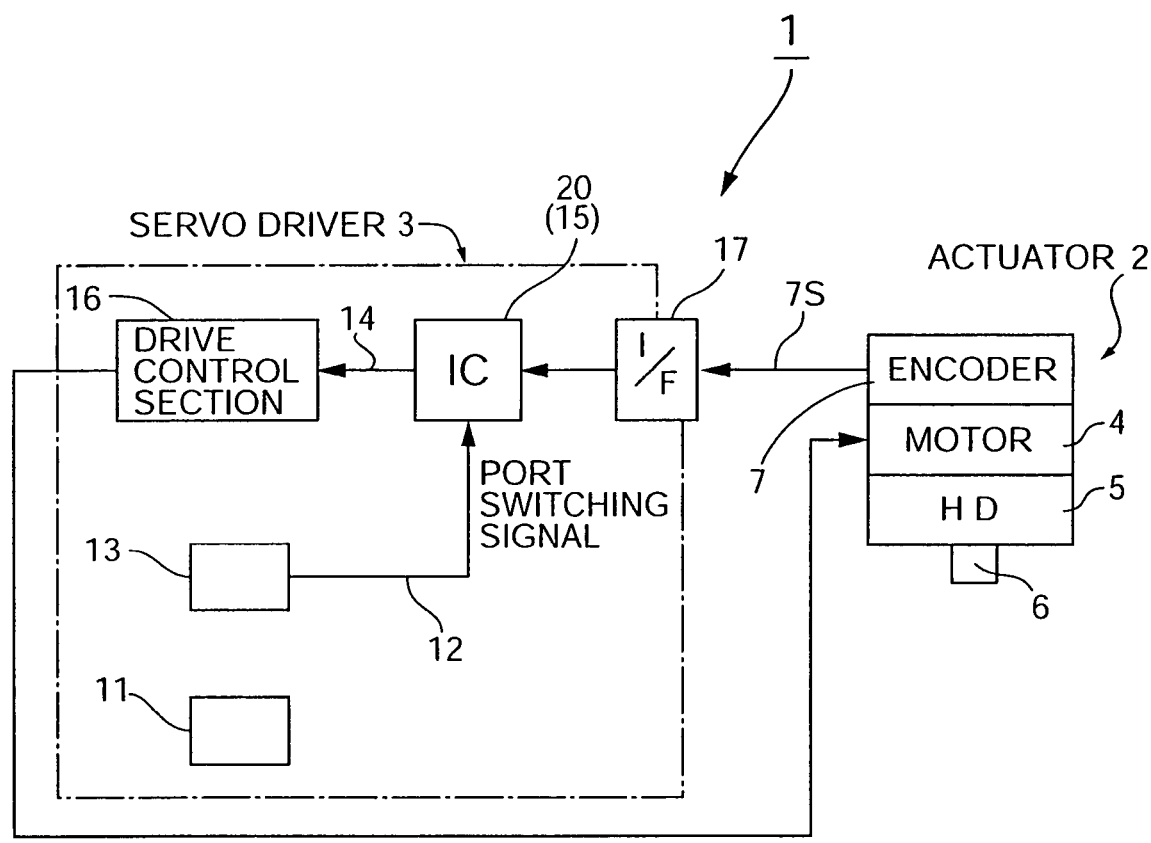
FIG. 1 is an overall block diagram showing an example of a servomechanism according to the present invention.

FIG. 1 is an overall block diagram showing a servomechanism of the present example. As shown in the diagram, a servomechanism 1 of the present example has an actuator 2 and a servo driver 3; the actuator 2 comprises a servomotor 4 and a reduction gear 5; and a reduction output shaft acts as an actuator output shaft 6. An optical encoder or another type of encoder 7 is mounted on a rotational shaft of the servomotor 4. Positional information and the like of the actuator 2 are detected and the actuator 2 is subjected to servo control on a side of the servo driver 3 on the basis of an output obtained from the encoder 7.

The servo driver 3 has an encoder type input section 11 for inputting and specifying whether the encoder 7 is a line-saving encoder or a 14-line encoder, and whether the encoder is an incremental encoder or an absolute encoder, a control section 13 for generating a control signal 12 that corresponds to the encoder type information input via the encoder type input section 11, an encoder signal processing section 15 for processing an encoder output signal 7S and generating a parallel signal 14 that shows positional information and the like of the actuator 2, on the basis of the control signal 12, and a drive control section 16 for servo-controlling the actuator 2 on the basis of the parallel signal 14. Also, the encoder output signal 7S is fed to the encoder signal processing section 15 via an I/O interface 17.

The servo driver 3 of the present invention principally comprises a computer composed of a CPU, ROM, RAM, and other components. The encoder signal processing section 15 is modularized as an encoder signal processing IC 20. The output signal 7S of the encoder 7 is received at the I/O interface 17 of the servo driver 3 and is input to the encoder signal processing IC 20. The encoder signal processing IC 20 determines the type of encoder 7 on the basis of the control signal 12 fed from the control section 13 indicating the type of encoder 7, processes the encoder output signal, and outputs to the drive control section 16 the parallel signal 14 that expresses actuator positional information and the like obtained thereby.

Figure 2:
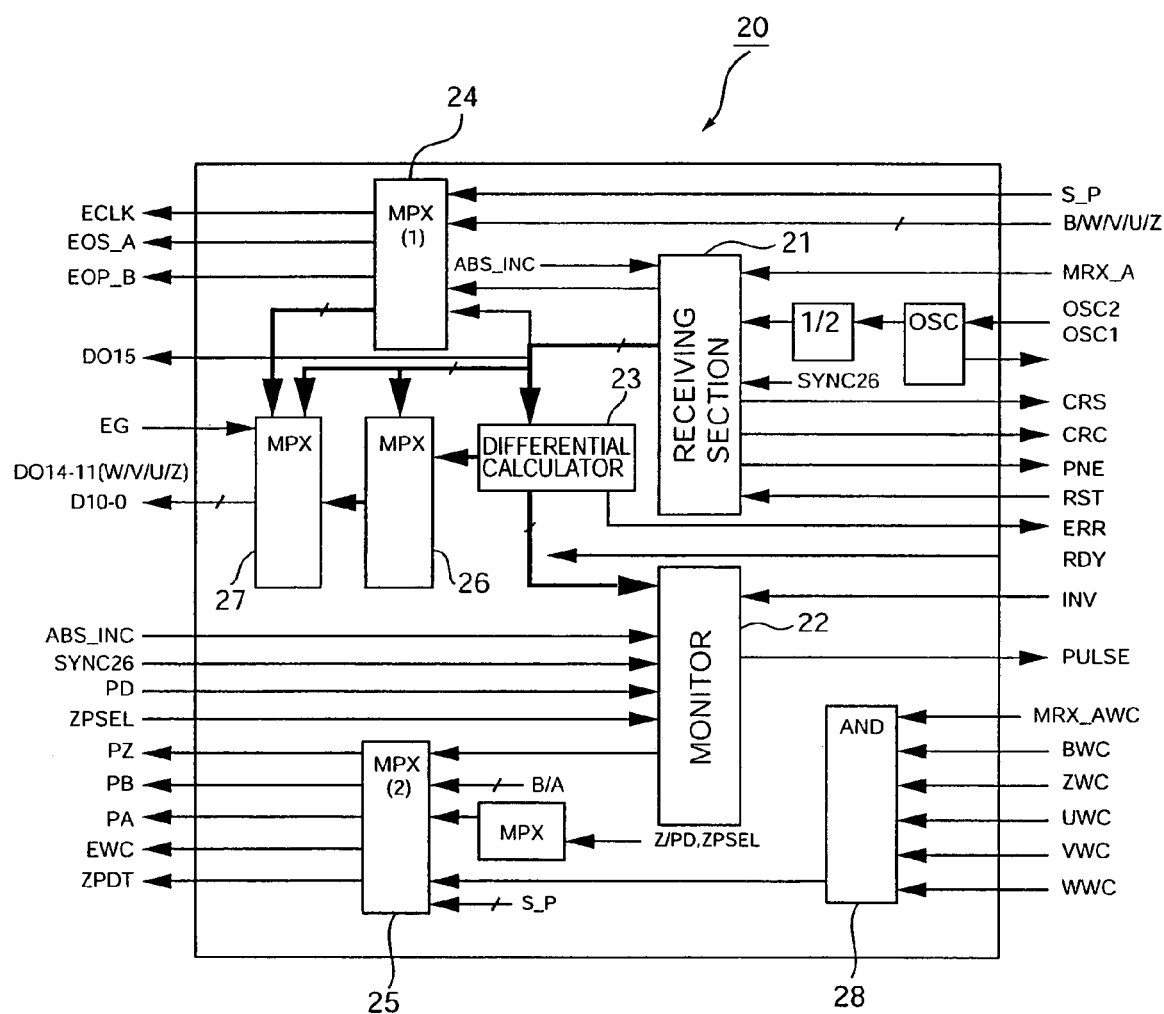
FIG. 2 is a schematic block diagram of an encoder signal processing IC of FIG. 1.

Next, FIG. 2 is a schematic block diagram showing the encoder signal processing IC 20 of the present example. The encoder signal processing IC 20 of the present example is a 16-bit encoder data receiver LSI that uses a CMOS gate array process, receives encoder serial data, converts the data to 16-bit parallel data, and generates an encoder monitor signal. Compatible encoder types are line-saving incremental and absolute encoders and 14-line encoders.

Serial data is input to a receiving section 21 in the encoder signal processing IC 20 and converted to 16-bit parallel data, and the parallel data is output. A monitor 22 is input the number of monitor pulses per fixed period of time, and on the basis of thereof generates the ABZ phase signals of the encoder 7. A difference calculator 23 calculates the difference between the current and previously received data, and outputs the result to the monitor 22. When absolute data is generated, multiple rotation data is output and then incremental data is output.

A data selector (1) 24 of the encoder signal processing IC 20 switches between ABZUVW phase signals in the input signal from the line-saving encoder and the input signal from the 14-line encoder. A switch to a serial side signal (7 bits) is made by the control signal (port switching signal) 12 when an external terminal S_P=0, and ECLK, EOS, EOP, and DO 14-11 are selected as output ports. When the external terminal S_P=1, a switch is made to a parallel side signal (7 bits), and A XOR B, A, B, W, V, U, and Z are selected as output ports.

A data selector (2) 25 switches ABZ phase signals of the monitor output in line-saving and 14-line encoders. When the external terminal S_P=0, a switch is made to a serial side signal (5 bits), and PZ, PB, PA, MPX_AWC, and (PZ or PD) are selected as output ports. An external terminal ZPDT outputs PD when ZPSEL=0 and PZ when ZPSEL=1. When the external terminal S_P=1, a switch is made to a parallel side signal (5 bits), and Z, B, MRX_A, 6 AND, and (Z or PD) are selected as ports. The term 6AND refers to the AND operation of six signals input to an AND unit 28. The external terminal ZPDT outputs PD when ZPSEL=0 and PZ when ZPSEL=1.

A data selector (3) 26 switches an internal signal output during incremental and absolute operation. The internal signal produced during incremental operation is selected when an external terminal ABS_INC=0, and the internal signal produced during absolute operation is selected when the external terminal ABS_INC=1. The output signal (10 bits) produced during incremental operation is comprised of DO 14-10, 0 (GND), 0 (GND), 0 (GND), 0 (GND), and difference flag. The output signal (10 bits) produced during absolute operation is comprised of packet selection, 0 (GND), BATT, MDER, OVFR, SYSD, Z-phase, difference flag, and difference outputs (6, 5).

Next, a data selector 27 switches between transmission data and differential data. Reception data is selected when an external terminal EG=0, and the reception data outputs a 16-bit parallel signal from the receiving section. When an external terminal EG=1, the selector outputs DO[15:10], 0 (GND), 0 (GND), 0 (GND), 0 (GND), difference flag, and difference outputs [4:0] during incremental operation (ABS_INC=0). Also, when the external terminal EG=1, the selector outputs DO 15, ENC, 0 (GND), BATT, MDER, OVFR, SYSD, Z-phase, difference flag, and difference outputs [4:0] during absolute operation (ABS_INC=1).

Table 1 is a terminal table of the encoder signal processing IC 20.

TABLE 1

Terminal table

| Pin No. | Signal Name | I/O | Buffer Type | Function |
|---|---|---|---|---|
| 1 | MRX_A | I | FI01 | Serial receive input |
| 2 | B | I | FI01 | B-phase input |
| 3 | Z | I | FI01 | Z-phase input |
| 4 | U | I | FI01 | U-phase input |
| 5 | V | I | FI01 | V-phase input |

TABLE 1-continued

Terminal table

| Pin No. | Signal Name | I/O | Buffer Type | | Function |
|---|---|---|---|---|---|
| 6 | W | I | FI01 | | W-phase input |
| 7 | ZWC | I | FI01 | | Z-phase open circuit detect |
| 8 | BWC | I | FI01 | | B-phase open circuit detect |
| 11 | MRX_AWC | I | FI01 | | MRX (A) phase open circuit detect |
| 12 | PZ | O | FO01 | CMOS 9 mA | Z-phase output |
| 13 | PB | O | FO01 | CMOS 9 mA | B-phase output |
| 14 | PA | O | FO01 | CMOS 9 mA | A-phase output |
| 15 | RST | I | FI01 | | Reset input |
| 17 | OSC1 | O | OSO1 | | Oscillator output 16 MHz |
| 18 | OSC2 | I | OSI1 | | Oscillator input |
| 20 | RDY | I | FI01 | | Output start input |
| 21 | EOS_A | O | FO04 | CMOS 6 mA | Packet receive output |
| 22 | EOS_B | O | FO04 | CMOS 6 mA | Output buffer latch output |
| 23 | ECLK | O | FO04 | CMOS 6 mA | A XOR B output |
| 25 | DO15 | O | FO04 | CMOS 6 mA | Parallel data bit15 output |
| 26 | DO14_W | O | FO04 | CMOS 6 mA | Parallel data bit14 output |
| 27 | DO13_V | O | FO04 | CMOS 6 mA | Parallel data bit13 output |
| 28 | DO12_U | O | FO04 | CMOS 6 mA | Parallel data bit12 output |
| 29 | DO11_Z | O | FO04 | CMOS 6 mA | Parallel data bit11 output |
| 30 | DO10 | O | FO04 | CMOS 6 mA | Parallel data bit10 output |
| 31 | DO9 | O | FO04 | CMOS 6 mA | Parallel data bit9 output |
| 33 | DO8 | O | FO04 | CMOS 6 mA | Parallel data bit8 output |
| 34 | DO7 | O | FO04 | CMOS 6 mA | Parallel data bit7 output |
| 35 | DO6 | O | FO04 | CMOS 6 mA | Parallel data bit6 output |
| 36 | DO5 | O | FO04 | CMOS 6 mA | Parallel data bit5 output |
| 37 | DO4 | O | FO04 | CMOS 6 mA | Parallel data bit4 output |
| 38 | DO3 | O | FO04 | CMOS 6 mA | Parallel data bit3 output |
| 39 | DO2 | O | FO04 | CMOS 6 mA | Parallel data bit2 output |
| 40 | DO1 | O | FO04 | CMOS 6 mA | Parallel data bit1 output |
| 42 | DO0 | O | FO04 | CMOS 6 mA | Parallel data bit0 output |
| 43 | ZPDT | O | FO04 | CMOS 6 mA | Port data output |
| 44 | ERR | O | FO04 | CMOS 6 mA | Receive error output |
| 46 | PD | I | FI01 | | Port data |
| 47 | ZPSEL | I | FI01 | | Z-phase/Port data select |
| 48 | SYNC26 | I | FI01 | | 0: 26 µs select<br>1: 42 µs select |
| 49 | S_P | I | FI01 | | 0: serial select<br>1: parallel select |
| 50 | ABS_INC | I | FI01 | | 0: incremental select<br>1: absolute select |
| 52 | EWC | O | FO04 | CMOS 6 mA | Encoder open circuit detect |
| 54 | UWC | I | FI01 | | U-phase input |
| 55 | VWC | I | FI01 | | V-phase input |
| 56 | WWC | I | FI01 | | W-phase input |
| 57 | EG | I | FI01 | | 0: Receive output<br>1: Difference output select |
| 60 | INV | I | FI01 | | A/B direction select |
| 61 | PNE | O | FO04 | CMOS 6 mA | Pulse noise error check output |
| 62 | PULSE | O | FO04 | CMOS 6 mA | Pulse output |
| 63 | CRS | O | FO04 | CMOS 6 mA | Carrier sense output |
| 64 | CRC | O | FO04 | CMOS 6 mA | CRC check monitor output |

VDD: pins 10, 45, 53
GND: pins 9, 16, 19, 24, 32, 41, 51

Figure 3:
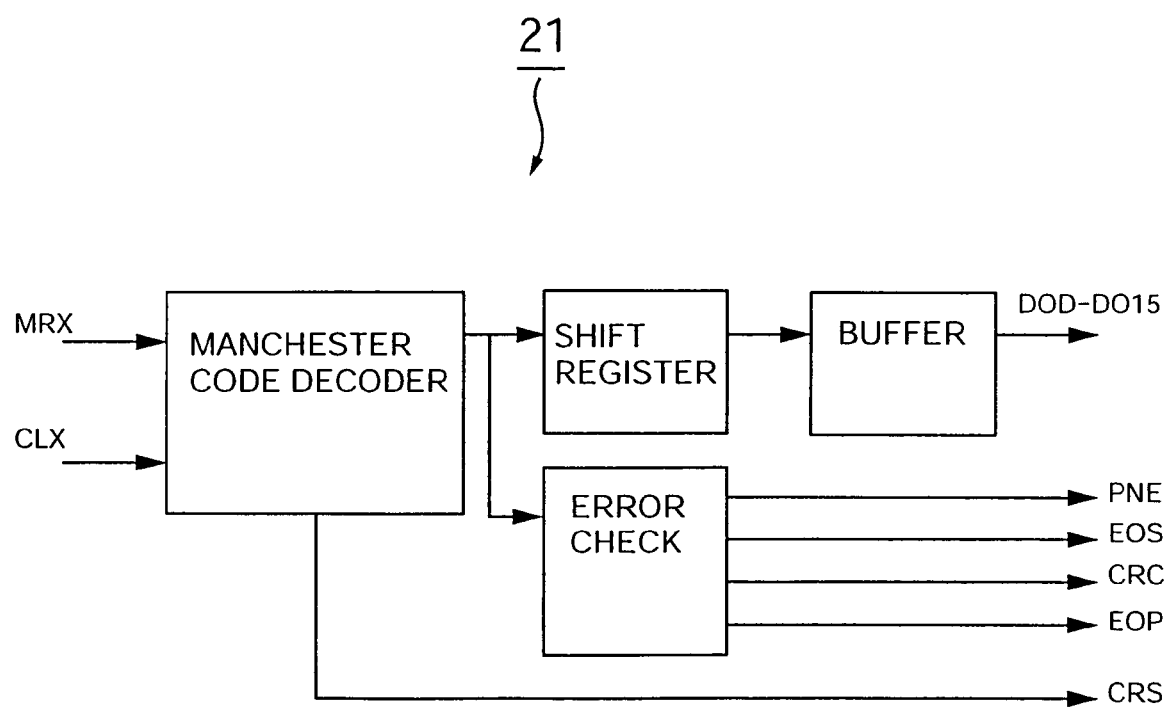
FIG. 3 is a schematic block diagram of a receiving section in FIG. 2.

FIG. 3 is a block diagram showing the configuration of the receiving section 21. In the receiving section 21, operations such as regenerating a cycle clock, reading the serial data, demultiplexing, CRC error checking, and updating the parallel data output are carried out and 16-bit data is received when serial reception data is input to an input terminal MRX in a receive-waiting state.

Figure 4:
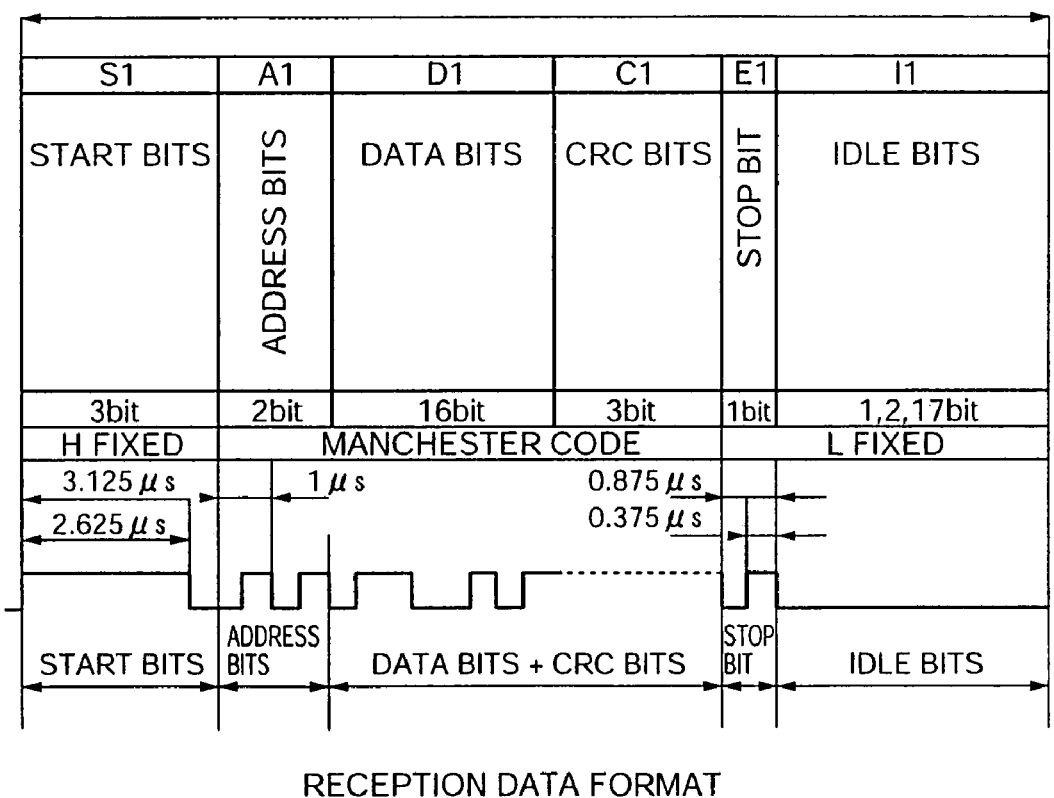
FIG. 4 is a diagram showing reception data format received from an encoder.

FIG. 4 shows the format of serial reception data (MRX). As shown in the drawing, serial reception data is comprised of start bits, address bits, data bits, CRC bits, a stop bit, and idle bits. There are 16 data bits; when an ABS_INC input signal is 0, the data is incremental; and when the input signal is 1, the data is absolute. Table 2 shows the bit configuration when the data is incremental, and Table 3 shows the bit configuration when the data is absolute.

TABLE 2

| ABS_INC = 0 (Incremental) | |
|---|---|
| Bit | Signal |
| DO0 | Incremental data bit0 |
| DO1 | Incremental data bit1 |
| DO2 | Incremental data bit2 |
| DO3 | Incremental data bit3 |
| DO4 | Incremental data bit4 |
| DO5 | Incremental data bit5 |

TABLE 2-continued

ABS_INC = 0 (Incremental)

| Bit | Signal |
|---|---|
| DO6 | Incremental data bit6 |
| DO7 | Incremental data bit7 |
| DO8 | Incremental data bit8 |
| DO9 | Incremental data bit9 |
| DO10 | Data continuity check signal |
| DO11 | Z |
| DO12 | U |
| DO13 | V |
| DO14 | W |
| DO15 | Frame data (H fixed) |

TABLE 3

ABS_INC = 1 (Absolute)

| Bit | 1st Data | 2nd Data |
|---|---|---|
| DO0 | $2^2$ | $2^{17}$ |
| DO1 | $2^3$ | $2^{18}$ |
| DO2 | $2^4$ | $2^{19}$ |
| DO3 | $2^5$ | $2^{20}$ |
| DO4 | $2^6$ | $2^{21}$ |
| DO5 | $2^7$ | $2^{22}$ |
| DO6 | $2^8$ | $2^{23}$ |
| DO7 | $2^9$ | $2^{24}$ |
| DO8 | $2^{10}$ | $2^{25}$ |
| DO9 | $2^{11}$ | SYSD |
| DO10 | $2^{12}$ | OVFR |
| DO11 | $2^{13}$ | MDER |
| DO12 | $2^{14}$ | BATT |
| DO13 | $2^{15}$ | $2^0$ |
| DO14 | $2^{16}$ | $2^1$ |
| DO15 | Frame data (L fixed) | Frame data (H fixed) |

In this configuration, absolute data is comprised of 13-bit counter data $2^{13}$ to $2^{25}$, which is multiple rotation information, and 13-bit counter data $2^0$ to $2^{12}$, which is single rotation information. The data are fed from the encoder as 2-frame/1-package serial data. Monitor output is performed in the encoder signal processing IC 20 on the basis of the serial data. First, multiple rotation information and single rotation information are sequentially monitored and output from the encoder 7, and monitor output for incremental signals is performed thereafter. Multiple rotation information shows the number of times the encoder 7 has rotated, and single rotation information shows the current position of the encoder 7 as an absolute position in the range of a single rotation. An incremental signal is a signal that is output as a monitor signal commensurate with the number of encoder rotations counted after multiple rotation information and single rotation information of absolute data have been monitored and output. More specifically, the incremental signal is a monitor output signal that is based on the data difference in each serial data receiving cycle.

Figure 5:
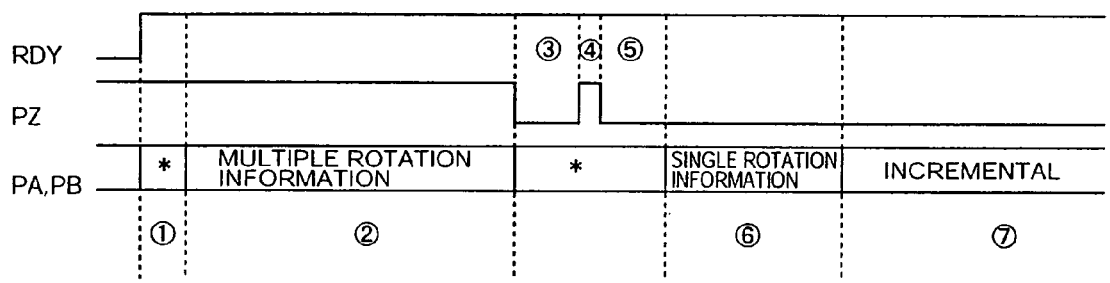
FIG. 5 is a timing chart of I/O signals of a monitor unit in FIG. 2.
Figure 6:
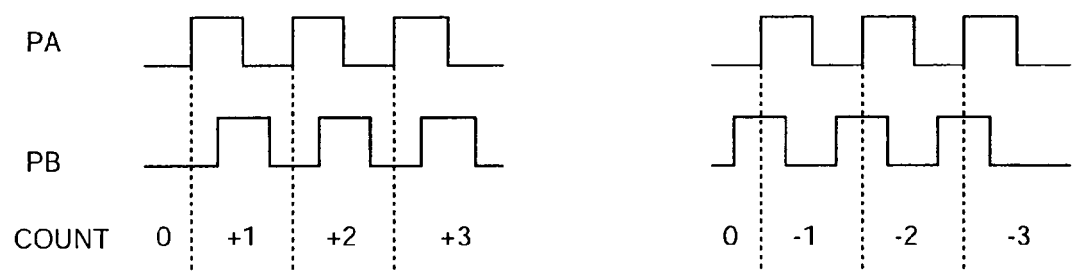
FIG. 6 is a timing chart showing signal specifications when multiple rotation information is output.
Figure 7:
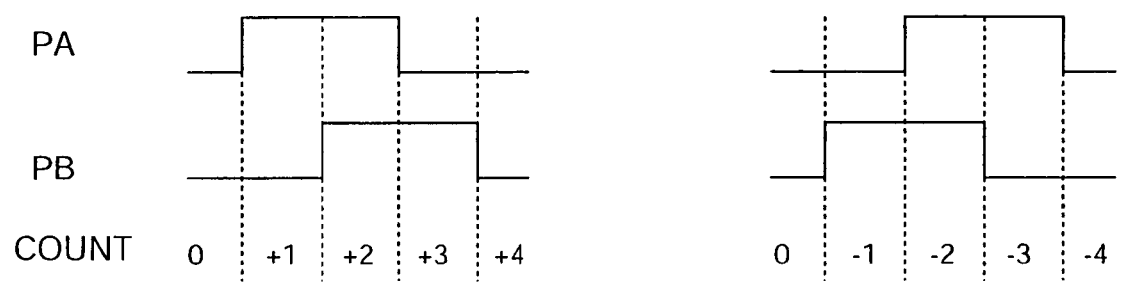
FIG. 7 is a timing chart showing single rotation information and signal use during incremental output.
Figure 8:
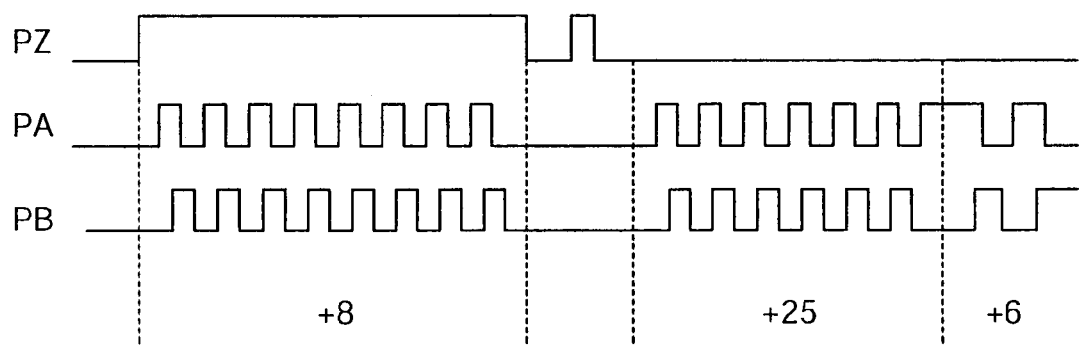
FIG. 8 is a timing chart showing an example of monitor output signals of multiple rotation information.

When an RDY signal is 1 and the monitor 22 is operating, the monitor output of multiple rotation information is started. The timing chart of the I/O signals is shown in FIG. 5. The signal specifications (PA and PB signals, which are 2-phase signals whose phases differ by 90°) during multiple rotation information output are shown in FIG. 6. Addition and subtraction are determined by the advance or delay of the PA and PB signals, and the count is performed at the rise of the PA signal. Furthermore, FIG. 7 shows the signal specifications during single rotation information and incremental data output. Addition and subtraction are determined by the advance or delay of the PA and PB signals, and the count is performed at the rise and fall of the PA and PB signals. FIG. 8 shows an example of the monitor output signal of multiple rotation information.

INDUSTRIAL APPLICABILITY

As described above, the servo driver of the present invention is configured to allow the I/O port of the encoder signal processing section to be switched in accordance with the type of encoder attached to the actuator and to ensure compatibility with the outputs of both the line-saving encoder and the 14-line encoder. The configuration is also made compatible with the encoder output of both the incremental encoder and the absolute encoder by internal signal switching in the encoder signal processing section.

Therefore, in accordance with the present invention, a general servo driver can be used in combination with an actuator even if the type of encoder attached to the actuator is different. It is thereby possible to overcome the drawback of the prior art whereby the servo driver must be modified in accordance with the type of encoder even if the motor and reduction gear are the same.

The invention claimed is:

1. A servo driver for driving/controlling an actuator on the basis of encoder output signals fed from an encoder attached to the actuator to be controlled, comprising:
    an encoder type input section for inputting whether the encoder is a line-saving encoder or a 14-line encoder, and whether the encoder is an incremental encoder or an absolute encoder,
    a control section for generating a control signal that corresponds to encoder type information input via the encoder type input section,
    an encoder signal processing section for processing the encoder output signal and generating a parallel signal that shows positional information of the actuator, on the basis of the control signal, and
    a drive control section for servo-controlling the actuator on the basis of the parallel signal.

2. The servo driver according to claim 1, wherein the encoder signal processing section has:
    a serial input port for inputting line-saving encoder signals,
    input ports that include the serial input port for inputting 14-line encoder output signals,
    an output port for outputting the parallel signal to the drive control section,
    a receiving section for converting serial data that is input from the serial input port, into the parallel signal with a prescribed number of bits, and
    a first data selecting section for selecting said serial input port or said input ports as the input port for the encoder signal on the basis of a port switching signal serving as the control signal fed from the control section.

3. The servo driver according to claim 2, wherein the encoder signal processing section has:
    a data generating section for generating incremental data and absolute data related to positional information of the encoder on the basis of the parallel signal generated in the receiving section, and
    a second data selecting section for selecting whether to output the incremental data or the absolute data from the output port on the basis of the control signal fed from the control section.

4. An encoder signal processing IC comprising the encoder signal processing section according to claim 1.

* * * * *